United States Patent [19]

Chen

[11] Patent Number: 5,285,186

[45] Date of Patent: Feb. 8, 1994

[54] VEHICLE SECURITY SYSTEM

[75] Inventor: Michael Chen, Taipei, Taiwan, China

[73] Assignee: Magnadyne Corporation, Compton, Calif.

[21] Appl. No.: 669,053

[22] Filed: Mar. 14, 1991

[51] Int. Cl.$^5$ ............................................. B60R 25/10
[52] U.S. Cl. .................................... 340/428; 340/426; 307/10.2
[58] Field of Search ............... 340/426, 428, 429, 430, 340/541, 562; 307/10.1, 10.2; 200/52 R

[56] References Cited

U.S. PATENT DOCUMENTS

| | | | |
|---|---|---|---|
| 4,706,064 | 11/1987 | Hwang | 340/430 |
| 4,866,417 | 9/1989 | DeFino et al. | 340/429 |
| 4,887,064 | 12/1989 | Drori et al. | 340/426 |
| 4,922,224 | 5/1990 | Drori et al. | 340/428 |

Primary Examiner—Jeffrey Hofsass
Attorney, Agent, or Firm—Poms, Smith, Lande & Rose

[57] ABSTRACT

A vehicle security system includes at least one sensor, a controller and at least one output device driver. The sensor has a rest state and a tripped state. The controller has an armed state and a disarmed state. The first output device driver transitions from its quiescent to its alarm state in response to the first sensor transitioning from its rest state to its trip state and the controller is in its armed state and furthermore when the ignition circuit is off. The first output device driver will remain in the quiescent state independently of the present state of the sensor if the ignition circuit is on and the controller is in its armed state. If the controller is in the disarm state, any activity by the sensor will not have any effect on the system.

35 Claims, 10 Drawing Sheets

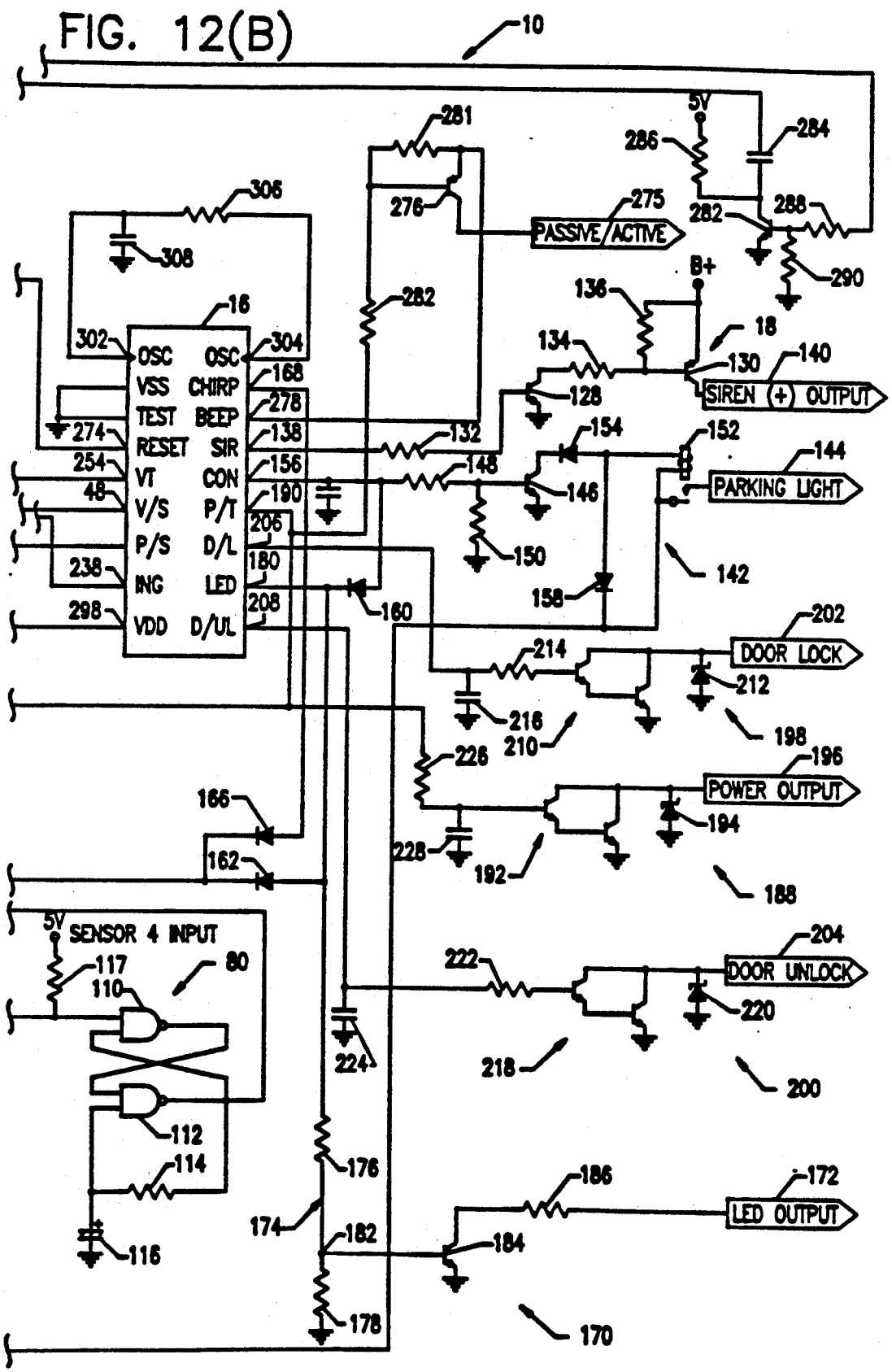

VEHICLE SECURITY SYSTEM

FIELD OF THE INVENTION

The present invention relates generally to secured area security systems, and more particularly to a novel vehicle security system.

BACKGROUND OF THE INVENTION

In general, a vehicle security system may operate in several ways to discourage the theft of a vehicle or the tampering with the contents therein. For example, a vehicle security system may operate to control ignition disablement, sound a theft triggered alarm, or both of these.

In one type of a vehicle anti-theft system, a receiver is mounted in the trunk of an automobile. The receiver is connected to the electrical system of the automobile, and when the system is "armed" the ignition system is disabled from operating. In order to operate the vehicle, a hand held transmitter is operated at the same time that the ignition system of the vehicle is turned on. The receiver recognizes the coded signal and inhibits further disablement of the ignition system. The system is armed automatically whenever the ignition is turned off. A key operated switch on the receiver is provided to allow the driver to deactivate the anti-theft system when such deactivation is desired. For example, one would deactivate the system when the car is parked by attendants with whom the key is left in a public garage.

It would appear that the automatic arming feature is a desirable one in that no action is required on the part of the operator to arm the system. The security controls of the anti-theft system are put into effect automatically when the ignition system is turned off. However, the automatic arming feature also has a significant disadvantage and limitation. This disadvantage and limitation may outweigh any of the advantages of the automatic arming feature in many cases.

For example, there are many times when an operator does not want to arm the anti-theft system. For example, the operator may desire to remain nearby the automobile and would accordingly not desire to be bothered by having to operate the transmitter in order to enable the ignition system upon the return to the vehicle. Another example is where the anti-theft system is equipped with an audible alarm which sounds in response to an attempt being made to gain unauthorized access to the vehicle. It is apparent that such a feature, the automatic arming, could pose a problem.

With automatic arming, the driver must be given time to leave the vehicle before the alarm system is enabled. Otherwise, when he opens the door in order to exit the vehicle, the alarm will be triggered. It is standard practice, therefore, in the case of vehicles having alarm systems which are automatically armed, to delay the arming of the system for a short time after the ignition is turned off, for example, thirty seconds. Conversely, a second delay, of perhaps fifteen seconds, is required to allow the authorized operator to re-enter the vehicle upon his return and disarm the system. The problem with this approach is that a trained automobile thief can foil the system before the short time delays have elapsed.

The use of time delays for ingress and egress from the vehicle while the alarm system is armed has been eliminated by the use of the transmitter, not only to disarm the system upon returning to the automobile, but also to arm it after leaving, as soon as the driver shuts and locks the door and is walking away from the vehicle. He may operate the transmitter at any time within the vicinity of the vehicle to arm or disarm the system.

This type of system has the advantage in that it will foil an attempt by any thief to enter the automobile after the driver has left and before the arming delay interval has expired. One prior art alternative to accomplishing this object is to provide a key operated switch on the outside of the vehicle itself, and it is certainly far easier to push a transmitter button in ones pocket than it is to take out and use a key for arming a system as is customary practice, not to mention that such a key switch is vulnerable to expert assault.

Furthermore, when the ignition system of the vehicle is on, the system may not be armed if the transmitter is activated to develop the encoded signal. The purpose of this feature is to prevent the disabling of the vehicle, such as by ignition cut off, when the vehicle is being operated and the transmitter inadvertently activates the receiver. However, a disadvantage and limitation of this feature is that when the user wants to leave the car shortly, for example, to make a telephone call, and keep the engine running, the system may not be armed. Yet another example when it is desirable to keep the engine running or at least keep the ignition system of the vehicle on, is when the operator wishes to pull into a rest stop and sleep inside the automobile and keep the radio or air conditioning operating, the above anti-theft system could not be armed while continuing to protect the car. Therefore, it is highly desirable to provide a security system which has both a theft deterrent and an occupant protection feature.

SUMMARY OF THE INVENTION

It is a feature of the present invention that the alarm system may be armed or disarmed when the vehicle ignition system is on. The system will then disable the outputs of the alarm system so that no alarm event is signaled even if a sensor is triggered.

In a broad aspect of the present invention, a vehicle security system includes at least one sensor, a controller and at least one output device driver. The sensor has a rest state and a tripped state. The controller has an armed state and a disarmed state. The first output device driver transitions from its quiescent to its alarm state in response to the first sensor transitioning from its rest state to its trip state and the controller is in its armed state and furthermore when the ignition circuit is off. The first output device driver will remain in the quiescent state independently of the present state of the sensor if the ignition circuit is on and the controller is in its armed state. Of course, if the controller is in the disarm state, any activity by the sensor will not have any effect on the system.

Thus, it is a broad feature of the present invention that the controller may be armed or disarmed at any time during vehicle operation or non-operation. This feature allows for great flexibility in the alarm system. However, to prevent false alarms, the controller even if armed will disable its outputs when the ignition is on, unless the ignition has come on subsequent to the controller being armed and the first sensor being tripped.

These and other objects, advantages and features of the present invention will become readily apparent from the following Description of the Exemplary Preferred Embodiment when read in conjunction with the attached Drawings and appended claims.

BRIEF DESCRIPTION OF THE DRAWINGS

FIG. 12a and 12b is a circuit diagram of a vehicle security system instructed according to the principles of the present invention which utilizes a microcontroller programmed in accordance with the flow diagrams of FIGS. 1-11.

DESCRIPTION OF AN EXEMPLARY PREFERRED EMBODIMENT

Figure 12A:
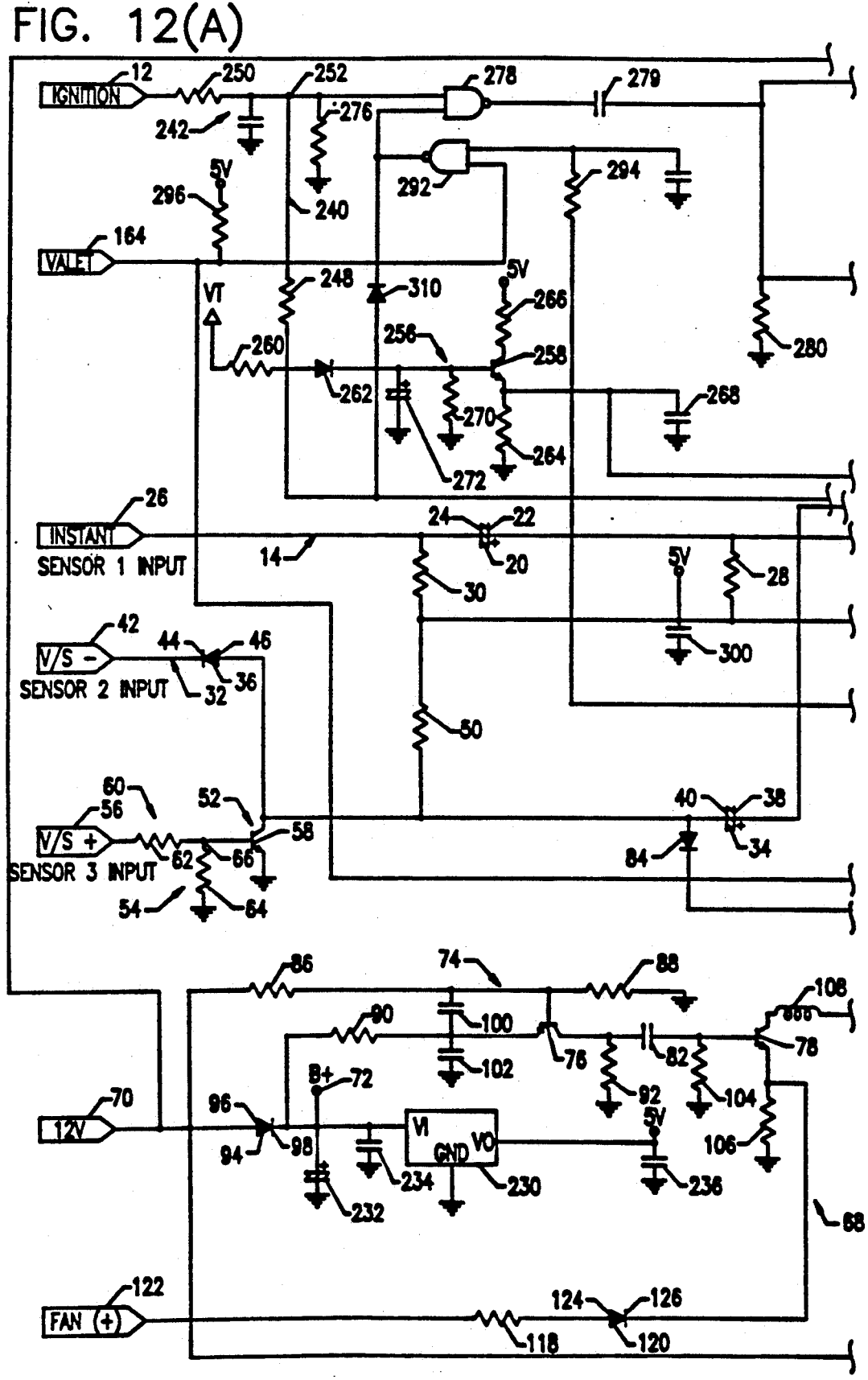

Referring initially to FIGS. 12a and 12b, there is shown a schematic diagram of a vehicle security system 10 constructed according to the principles of the present invention. The vehicle security system 10 is particularly useful for a vehicle (not shown) which has an ignition circuit 12 which may be selectively on or off. The security system 10 has at least a first sensor 14, a controller 16 and a first output device driver 18. As will be explained in greater detail hereinbelow, the sensor 14 has a rest state and a tripped state. The tripped state will generally indicate that an unauthorized tampering, such as an intrusion attempt, attempted towing, vandalism or some other tampering, with the vehicle has occurred. The controller 16 has an armed state and a disarmed state. The first output device driver 18 has a quiescent state and an alarm state.

In a broad aspect of the present invention, the first output device driver 18 transitions from its quiescent to its alarm state in response to the first sensor 14 transitioning from its rest state to its trip state and the controller 16 is in its armed state and furthermore when the ignition circuit 12 is off. The first output device driver 18 will remain in the quiescent state independently of the present state of the sensor if the ignition circuit 12 is on and the controller 16 is in its armed state. Of course, if the controller 16 is in the disarm state, any activity by the sensor 14 will not have any effect on the system. Thus, it is a broad feature of the present invention that the controller 16 may be armed or disarmed at any time during vehicle operation or non-operation. This feature allows for great flexibility in the alarm system. However, to prevent false alarms, the controller 16 even if armed will disable its outputs when the ignition is on, unless the ignition has come on subsequent to the controller 16 being armed and the first sensor 14 being tripped.

The operation of the controller 16 will be described in greater detail hereinbelow in reference to the flow diagrams of FIGS. 1-11. Described immediately hereinbelow is a description of the various sensors and output device drivers and other hardware which interacts with the controller 16. Upon completion of this description of the hardware, its operation will be readily understood in conjunction with the operation of the controller 16 executing the instructions set forth in the flow diagrams.

The first sensor 14 includes a capacitor 20. The capacitor 20 has a first plate 22 and a second plate 24. The first plate 22 is coupled to the controller 16. Each of the first plate 22 and the second plate 24 have a first biased potential applied thereto. By applying the same bias potential to each plate 22 and 24 of the capacitor 20, the capacitor 20 remains discharged. The second plate 24 of the capacitor 20 is electrically coupled to a further circuit 26 of the vehicle. The further circuit 26 may present either an open circuit to the second plate 24 of the capacitor 20 or be at a normal second potential. The further circuit 26 will apply a third potential to the second plate 24 of the capacitor 20 in the event of unauthorized tampering with the vehicle. This third potential when coupled to the second plate 24 of the capacitor 20 will cause the first plate 22 to momentarily transition to the third potential. This momentary transition signals the controller 16 that the first sensor 14 is tripped.

It is shown in FIG. 12a, that the capacitor 20 is biased with an identical potential at each plate 22, 24 of the capacitor remains discharged. Of course, different bias potentials could be used so that a charge remains on the capacitor. It is an equivalent such that when a second plate 24 is transitioned to another potential, that the voltage across the capacitor could not instantaneously change, thereby causing the first plate 22 to track the potential change of the second plate 24. The first plate 22 then becomes recharged by the bias of potential applied thereto. Functionally, the capacitor 20 develops a pulse to signal the controller 16 that the first sensor 14 has been tripped. Any biasing of the capacitor 20 which accomplishes this function is an obvious equivalent to the exemplary biasing scheme shown in FIG. 12a.

In particular, to bias the capacitor 20, the sensor 14 further includes a first resistor 28 and a second resistor 30. The first resistor 28 is coupled between the first plate 22 and the first potential. Similarly, the second resistor 30 is coupled between the second plate 24 and the first potential. The first potential recharges the first plate 22 by a current through a first resistor 28 when the first sensor 14 is in the tripped state. When the sensor 14 is in the tripped state, a voltage will be developed across the capacitor 20. When the sensor 14 returns to the rest state, a current is developed through each of the first resistor 28 and the second resistor 30 to discharge the capacitor.

As best seen in FIG. 12a, the first potential is a five volt positive source potential. The second potential may be a ground potential should the further circuit 26 be a normally open circuit which is coupled to ground to trip the sensor 14 or may be a high potential circuit which will go to ground potential upon intrusion or tampering with the vehicle. Accordingly, the capacitor 20 develops a ground potential pulse which signals the controller 16 that the sensor 14 has been tripped. As stated hereinabove, other biasing of the capacitor 20 may be utilized and other biasing of the controller 16 may also be utilized such as a positive pulse to signal the controller 16.

The security system 10 also has other types of sensors which utilize a capacitor to develop a pulse to signal the controller that the sensor 14 has been tripped. The comments above regarding the plurality of this pulse and the biasing of each plate of the capacitor will apply to each of the hereinbelow described sensors. Accordingly, different biasing schemes from those described are to be considered obvious equivalent for reason as set forth hereinabove.

A second sensor 32 includes a capacitor 34 and a diode 36. The capacitor 34 has a first plate 38 and a second plate 40. The first plate 38 is coupled to the controller 16. Each of the first plate 38 and the second plate 40 are each biased at a first bias potential. The diode 36 is electrically coupled between the second plate 40 and a second further circuit 42 of the vehicle. The second further circuit 42 is normally biased at a second potential. The diode 36 becomes forward biased when the second further circuit 42 is at a third potential which indicated intrusion or other tampering with the vehicle. The forward biased diode 36 then couples the third potential to the second plate 40 of the capacitor 34. The first plate 38 in response to momentary transitions to the third potential to signal the controller 16 that the second sensor 32 is tripped.

Typically, the second further circuit 42 may be one which is at a normally high positive vehicle battery potential and which is switched to ground potential upon an intrusion into the vehicle. With this arrangement, the diode 36 may have a cathode 44 coupled to the second further circuit 42 and an anode 46 coupled to the second plate 40 of the capacitor 34. Accordingly, the controller will have a first input 48 to which the first plate 38 of the capacitor 34 is coupled. This first input may be internally biased within the controller 16 at the first potential to recharge the first plate 38 when the second sensor 32 is in its tripped state. The second sensor 32 may further include a resistor 50 coupled between the second plate 40 of the capacitor 34 and the first potential. The capacitor 34 is discharged upon the second sensor 32 returning through its rest state through a current through each of the resistor 50 and the input 48. Again, the first potential may be a five volt positive source potential. The second potential is the vehicle battery potential and the third potential is ground potential as discussed hereinabove.

The vehicle security 10 may also include a third sensor 52. The third sensor 52 utilizes the second capacitor 34 and the resistor 50, described hereinabove in conjunction with the second sensor 32. The function of the capacitor 34 and resistor 50 is identical in the description of the third sensor 52. In particular, third sensor 52 has a transistor circuit 54 coupled between the second plate 40 and a third further circuit 56 of the vehicle. A third further circuit is normally at a third potential. The transistor circuit 54 changes state when the second further circuit 56 is at a second potential at which the transistor circuit 54 inverts the third potential to the second plate 40. The first plate 38 momentarily transitions to the third potential in response thereto to signal the controller 16 that the third sensor 52 is tripped.

In particular, the transistor circuit 54 includes an NPN transistor 58 and a voltage divider 60. The transistor 58 has a base, a collector and an emitter. The collector is coupled to the second plate 40. The emitter is coupled to the third potential.

The voltage divider 60 has a series coupled first resistor 62 and second resistor 64. The base is coupled to a node 66 common between the first resistor 62 and the second resistor 64. The second resistor 64 is coupled between the node 66 and the third potential. The first resistor 62 is coupled between the node 66 and the third further circuit 56. The first resistor 62 has a second potential applied thereto when the third further circuit 56 is at the second potential such that a base drive is developed at the node 66 to turn the transistor 58 on. When the transistor 58 is turned on, the third potential is coupled to the second plate 40 of the capacitor 34. In response thereto, the first plate 38 thereof momentarily transitions to the third potential to signal the controller 16 that the third sensor 52 is tripped. The first, second and third potential and the first input 48 of the controller 16 interacts with the third sensor 52 as described hereinabove in reference to the second sensor 32.

Finally, the vehicle security system 10 may include a fourth sensor 68. The fourth sensor detects a current in the vehicle's alternator circuit 70. This current causes the alternator potential of the alternator circuit 70 to momentarily drop below the battery potential of the battery circuit 72. It is to be understood that the alternator circuit 70 is a voltage regulated circuit in which a sudden high amperage current will cause the potential thereof to momentarily drop.

More particularly, the fourth sensor 68 includes a current sensing circuit 74 in addition to utilizing the capacitor 34 described hereinabove. Accordingly, the capacitor 34 function identically as described hereinabove with reference to the second sensor 32 and third sensor 52.

The current sensing circuit 74 is responsive to the battery potential of the battery circuit 72 and the alternator potential of the alternator circuit 70 to develop a pulse in response to the current developed in the alternator circuit 70 when such current drops the alternator potential less than the battery potential. The pulse indicates that the fourth sensor 68 is in its tripped state.

The current sensing circuit 74 includes a first transistor 76, a second transistor 78 and a monostable circuit 80. The first transistor 76 is biased by each of the alternator potential and the battery potential. As will be described in greater detail hereinbelow, the biasing of the transistor 76 is such that transistor 76 turns on when the alternator potential is less than the battery potential.

The transistor 78 is capacitively coupled through a capacitor 82 to the transistor 76. The capacitive coupling causes the second transistor 78 to turn on momentarily in response the transistor 76 turning on.

The monostable circuit 80 is coupled to the transistor 78. The monostable circuit 80 has a normally biased first state and an unstable second state. The monostable circuit 80 develops the hereinabove mentioned pulse when its in its second unstable state. When the monostable circuit 80 goes in its unstable second state, it develops a ground potential pulse which is coupled the second plate 40 of the capacitor 34 through a diode 84. The diode 84 becomes forward biased when the monostable circuit develops the ground potential pulse. Accordingly, the capacitor 34 in response to the ground potential pulse causes its first plate 38 to momentarily go to ground potential thereby applying a pulse to the first input 48 of the controller 16 to signal the controller 16 that the fourth sensor has been triggered.

Biased the transistor 76, the fourth sensor 68 includes a base drive resistor 86, a base bias resistor 88, an emitter resistor 90, a collector bias resistor 92 and a diode 94. The base drive resistor 86 is coupled between the base of the transistor 76 and the alternator circuit 70 to receive the alternator potential thereof. The base bias resistor 88 is coupled between the base of the transistor 76 and ground potential. The emitter resistor 90 is coupled between the battery circuit 72 to receive the battery potential and the emitter of the transistor 76. As shown in FIG. 12a, the transistor 76 is a PNP transistor with its collector coupled to the transistor 78 through the capacitor 82. The collector bias resistor 92 is coupled between the collector of the transistor 76 and ground potential.

The diode 94 has an anode 96 and a cathode 98. The anode 96 is coupled to the alternator circuit 70 and the cathode 98 is coupled to the battery circuit 72. During normal operations, the diode 94 is therefore normally forward bias thereby keeping the PNP transistor 76 off, since there is no base bias voltage across the base emitter junction of this transistor. During the current draw on the alternator circuit 70, the alternator potential becomes less than the battery potential 72, the diode 94 becomes reverse bias. When the diode 94 reverse bias, a biasing base emitter voltage is developed across the base emitter junction of the transistor 76 turning this transistor on. Coupled between the base emitter junction of the transistor 76 is a capacitor 100. Furthermore, the emitter is capacitively coupled to ground potential through a capacitor 102.

The transistor 78, as best seen in FIG. 12a, is an NPN transistor having a base, collector and an emitter. The base of the transistor 78 is coupled through the capacitor 82 to the collector of the transistor 76. The collector of the transistor 78 is an electrical communication with the monostable circuit 80.

To bias the transistor 78, the fourth sensor 68 includes a base bias resistor 104 and an emitter resistor 106. The base bias resistor 104 is coupled between the base of the transistor 78 and ground potential. The emitter resistor 106 is coupled between the emitter of the transistor 78 and ground potential. Collecting the collector of the transistor 78 to the monostable circuit is an inductor 108.

As best seen in FIG. 12b, the monostable circuit 80 includes a first NAND gate 110, a second NAND gate 112, a resistor 114 and a capacitor 116 The first NAND gate 110 has a first input biased at the positive source potential with the input further coupled with the collector of the transistor 78 through the inductor 108. The second NAND gate 112 has its first input coupled to the output of the first NAND gate 110. The second input of the first NAND gate 110 is coupled to the output of the second NAND gate 112.

The resistor 114 is coupled between the second input and the output of the second NAND gate 112. The capacitor 116 is coupled between the second input of the second NAND gate 112 and ground potential.

The biasing of the first input of the first NAND gate 110 is through a resistor 117 coupled thereto source potential. The capacitor 116 is also biased by the source potential through the resistor 50 coupled to source potential in series with diode 84 and resistor 114. Therefore, the output of the first NAND gate 110 is normally low forcing the output of the second NAND gate high.

When the transistor 78 turns on, it forces the first input of the first NAND gate 110 to a low potential switching its output to a high potential. Accordingly, each input of the second NAND gate 112 goes high causing its output to momentarily go low. When the output of the second NAND gate 112 goes low, the ground potential pulse is developed at forwarding biasing the diode 84. This pulse is then transmitted through capacitor 34 as hereinabove described. When the diode 84 is forward biased, during this pulse, the capacitor 116 is recharged thereby elevating the potential at the output of the second NAND gate 112 and hence the potential at the second input to the first NAND gate 110 to high potential causing the monostable circuit 80 to return to its first normally biased state.

There are some vehicles which have a radiator cooling fan which is driven by an electric motor, instead of by crank shaft fan belts. The electric motor is thermostatically controlled to turn the fan on and off as needed instead of having a constant running fan driven by the fan belt. The advantages of such a system reduce losses due to drag on the engine from additional pulleys and belts and from losses when the air flow through the radiator and fan is greater than the air flow which the fan would pull thereby increasing engine load. However, in these types of vehicles, the fan may turn on after the vehicle has been stopped with the engine off. Should the controller 16 be armed and have the electrically controlled fan turned on, there will be a significant current developed in the alternator circuit 70 causing the current sensor 68 to trip and signal the controller 16 thereby triggering the output driver 18 to its alarm state.

To prevent such a false alarm, the vehicle security system 10 may further include a resistor 118 and a diode 120 coupled in series between the emitter of the transistor 78 and a fan circuit 122 of the vehicle. Should the fan circuit 122 cause the transistor 76 to turn on, a positive voltage is applied to the emitter of transistor 78, to maintain is base emitter junction reverse bias to keep this transistor 78 off. More particularly, the resistor 118 is coupled in series between the fan circuit 122 and the anode 124 of the diode 120. The cathode 126 of the diode 120 is coupled to the emitter of the transistor 78.

With reference in FIG. 12b, the first output device driver 18 includes an NPN transistor 128, a PNP transistor 130, a resistor 132, a resistor 134 and a resistor 136. The resistor 132 is coupled in series between an output 138 of the controller 16 in the base of the transistor 128. The resistor 134 is coupled in series between the collector of the transistor 128 and the base of the transistor 130. The emitter of the transistor 128 is coupled to ground potential.

The resistor 136 is coupled between the base of transistor 130 and battery potential. The emitter of transistor 130 is also coupled to battery potential. The collector of transistor 130 is coupled to an output device 140.

When the output 138 of the controller 16 is triggered, thereby going to a high potential, a base drive current is developed through resistor 132 to turn the transistor 128 on. The collector of the transistor 128 thereby goes low developing a base drive current through the resistor 134. This base drive current will develop a potential drop across the resistor 136 thereby forward biasing the base emitter junction of the transistor 130. The configuration of the transistor 130 is particularly useful where the output device 140 is a siren.

Security system 10 also includes other types of output device drivers, which are configured to drive different types of output devices. For example, a second output device driver 142 is useful where the output device 144 is a parking light. The output device driver 142 includes an NPN transistor 146, a base driver resistor 148, a base bias resistor 150, a relay 152 and a diode 154.

The emitter of the transistor 146 is coupled to ground potential. The base drive resistor 148 is coupled in series between an output 156 of the controller 16 and the base of the transistor 146. The base bias resistor 150 is coupled between the base of the transistor 146 and ground potential.

The relay 152 has a first terminal coupled to the battery potential of the vehicle, another terminal coupled to the anode of the diode 154 and the switched output terminal coupled to the output device 144. The cathode of the diode 154 is coupled to the collector of the transistor 146. When the output 156 of the controller 16 is triggered, a positive source potential is applied to the base drive resistor 148 to turn on the transistor 146. When this transistor turns on, the diode 154 becomes forwarding biasing developing a current through the relay 152. This current causes the switched output, being an armature, who can knock battery potential to output device 144, as is well known in relay circuits.

On a trigger potential from the output 156 is removed, to turn off the transistor 146, the normally nonconductive diode 158 will become forward biased to short out any inductive voltage within the winding of the relay 152.

The second output device driver 142 may also include a diode 160. The diode 160 will become forward bias when the output 156 of the controller is triggered. Thus, at the moment that the output device driver 142 is enabled, the forward bias diode 160 will also enable a further device driver of the security system 10. Also, another diode 162 will also become forward bias when the output 156 is triggered. The diode 162 is coupled to a reset circuit, which will be described in greater detail hereinbelow. The forward bias diode 162 will cause the triggered output 156 of the controller 16 to become shorted to ground potential when a valet switch 164 is closed. The valet switch 164, when closed, coupling the cathode of the diode 162 to ground potential will thereby disable the output 156 of the controller 116. Normally, the valet switch 164 is open. The function of the valet switch is the prevent any visual output from the alarm system when the vehicle has been left with the parking valet. As will be more apparent from the description hereinbelow, when the valet switch 164 is closed, another diode 166 will become forward biased and ground in input 168 of controller 16 to signal the controller 16 that the valet switch is closed. This will cause a valet subroutine to be executed within the controller 16, the subroutine described below.

A third device driver 170 of the security system 10 is useful for driving a light emitting circuit 172. The third device driver 170 includes a voltage divider 174 having a resistor 176 and a resistor 178. The voltage divider 174 is coupled between an output 180 of the controller 16 in ground potential. More particularly, the resistor 176 is coupled to the output 180 and the resistor 178 is coupled to ground potential with anode 182 common between the resistor 176 and resistor 178.

The third output device driver 170 also includes an NPN transistor 184 and a resistor 186. Transistor 184 is an NPN transistor having a base, and emitter and a collector. The emitter of the transistor 184 is coupled to ground potential. The base of the transistor 184 is coupled to the node 182. The resistor 186 is coupled in series between the collector of the transistor a 184 and the LED output circuit 172. When the output 180 of the controller 16 is triggered, the voltage at the node 182 is raised thereby forward biasing the base emitter junction of the transistor 184. The collector current of the transistor 184 then drives the LED output circuit 172, with the current being limited by the collector resistor 186.

The vehicle security system 10 may also include one or more high current output device drivers useful for driving various accessories of the vehicle. For example, an output device driver 188 may be coupled to a power output 190 of the controller 16. When the power output 190 is triggered, the Darlington pair 192 is turned on with the voltage regulated by a zener diode 194 to drive an output accessory 196.

A similar type output device driver 198 at and another output device driver 200, may for example, be used for a door lock circuit and a door unlock circuit 204, respectively. The door lock opposite device driver 198 is coupled to the door lock output 206 of the controller 16 and door unlock 208 of the controller 16, respectively.

A door lock output device driver 198 includes a Darlington pair 210 and a zener diode 212 to regulate the voltage. A base drive resistor 214 is coupled to the base of the first transistor of the Darlington pair 210. A capacitor 216 is coupled between a door lock output 206 and ground potential.

Similarly, the door unlock output device driver 200 includes a Darlington pair 218 and an output zener diode 220. A base driver resistor 222 is coupled in series between the door unlocked output 208 and the base of the first transistor in the Darlington pair 218. A capacitor 224 is also coupled between the door unlock output 208 and ground potential.

In the power output device driver, a base drive resistor 226 is coupled in series between the power output 190 of the controller 16 and the base of the first transistor in the Darlington pair 192. A capacitor 228 is coupled between the base of this transistor and ground potential. In each of the high current device drivers 188, 198 and 200, the respective output 190, 206, 208 has triggered to a high source potential.

To develop the five volt source potential, the security system 10 includes a voltage regulator 230 having an input coupled to the battery circuit 72 and an output which develops the five volt source potential. As is well known, the input of the voltage regulator 230 may be biased by capacitors 232, 234 and the output bias by a charged storage capacitor 236.

In the operation of the vehicle security system 10, the controller 16 is responsive to the presence of the ignition circuit 12 being on at an ignition input 238. When the ignition is on, as stated hereinabove, the controller 16 disables its outputs from triggering even if the controller is armed and a sensor is in its tripped state. However, the ignition must be on prior to the sensor being tripped. Otherwise, if the ignition is turned on subsequent to the sensor being tripped, the controller 16 will not remove its triggered state from its output, otherwise the vehicle security system 10 could easily be defeated.

The vehicle security system 10 has an ignition buffer circuit 240 connected between the ignition circuit and the ignition input 238. The ignition buffer circuit 240 includes a low pass filter 242 and a resistor 250. The resistor 250 is in series with the low pass filter 242 and the ignition input 238. The low pass filter 242 is thereby in series between the ignition circuit 12 and the resistor 250.

The low pass filter 242 is of conventional design includes a resistor 250 coupled in series between the ignition circuit 12 and the resistor 248. It further includes a capacitor coupled between ground potential and anode 252 common to the resistor 248 and the resistor 250.

To change the state of the controller 16 between its armed state and disarmed state, an external arm disarm signal may be developed, such as by a remote RF transmitter receiver combination, P switch or other user active device to signal the controller to change state. Accordingly, the controller 16 has an arm disarm input 254 at which the pulse is received. Between the active device which the user activates to arm or disarm the controller 16, the security system 10 includes an arm disarm buffer circuit 256 coupled to the arm-disarm 254.

The arm disarm buffer circuit 256 includes an NPN transistor 258, a base drive resistor 260, a diode 262 and an emitter resistor 264.

The base drive resistor 260 is coupled in series between the external circuit which develops the arm disarm signal and the anode of the diode 262. The cathode of the diode 262 is coupled to the base of the transistor 258. The emitter resistor 264 is coupled between the emitter of the transistor 258 and ground potential.

When the external circuit is activated to generate the arm disarm signal, the diode 262 becomes forward bias in response to the signal being applied to the signal being applied to the resistor 260 to turn on the transistor 258. The emitter current of the transistor 258 develops a current through the emitter resistor 264, thereby raising the voltage of the emitter to signal the controller at its arm disarm input 254 to change state.

The collector of the transistor 258 is bias to the source potential. To limit the collector current, a resistor 266 is coupled in series between the collector of the transistor 258 and the source potential. To smooth switching transients at the emitter of the transistor 258, a capacitor 268 is coupled in parallel with the emitter resistor 264. Finally, a base bias resistor 270 is coupled between the base of the transistor 258 and ground potential. A capacitor 272 may also be coupled in parallel with the base bias resistor 270.

Instead of a user activated external device being used to arm or disarm the controller 16, the controller 16 may be operated in a passive mode. In a passive mode, the controller 16, as will be apparent from the description of the flow diagrams, will be armed when the ignition circuit 12 is turned off and disarmed when the ignition circuit 12 is turned on with appropriate time delays as is well known in the art. To select the passive mode, a passive/active switch 274A grounds the collector of a PNP transistor 276 to select this passive mode. When the controller 16 is disarmed, its power up with 190 is low. This allows transistor 276 to be active through its emitter coupled to the output 278 of the controller 16. When the controller 16 is armed, the power output 190 will go high thereby turning the transistor 276 off. If the voltage at the output 278 of the controller 16 is high, transistor 276 is off meaning that the passive active switch 274 is set in the active mode. If set in the passive mode, the transistor is on thereby maintaining the voltage at the output 278 low. Thereby, the voltage at the output 278 determines if the active or passive mode has been selected. To bias the transistor 276, a resistor 280B is coupled between its emitter and base and a resistor 282 is coupled between its base and the power output 190.

To reset the controller 16, the controller has a reset input 274, which is normally biased at the high source potential. When a ground potential reset pulse is applied to the reset input 274, the controller goes into a reset mode, which will be described hereinbelow. The reset mode initializes the controller 16 when the controller 16 is in its disarmed state. There are three events which will cause the reset pulse to be developed.

The first of these events is when the ignition circuit 12 is turned on. When the ignition circuit 12 goes from off to on, the voltage at the node 252 goes high. The high voltage of node 252 develops a current through a resistor 276 biasing a first input of a NAND gate 278 to high potential. Second input of the NAND gate 278, as will become more apparent from the description hereinbelow, is already at a high potential.

Coupled in series between the reset input 274 and the output of the NAND gate 278, is a capacitor 280. Prior to the ignition circuit 12 being turned on, each plate of the capacitor 280 is biased at a high potential and thereby discharged. When the ignition switch 12 is turned on, both inputs of the NAND gate 278 now go high forcing the output of the NAND gate 278 to go low. This ground potential pulse is then coupled through the capacitor 280 through the reset input developing low potential pulse to reset the controller 16. A current from the reset input 274 through a resistor 280 recharges the capacitor 280A while the ignition is on. After the ignition is turned off, the output of the NAND gate 278 goes high. The resistor 280 thereby allows the capacitor 280 to be discharged. In this mode, the NAND gate 278 operates as a simple invertor between the ignition circuit 12 and the reset input 274. Circuit to develop the reset pulse in the ignition circuit 12 also includes a low pass filter 242 describe hereinabove.

A second mode in which the reset pulse may be developed is when the controller 16 is connected to external power, such as the alternator circuit 70. The reset input 274 is connected to the collector of a transistor 282 through a capacitor 284. The collector of the transistor 282 is biased to the source potential through a resistor 286. Therefore, the capacitor 284 is normally discharged. When the alternator circuit 70 turns on, a current is developed through base drive resistor 288 and base bias resistor 290 to forward bias the base emitter junction of the transistor 282 with its emitter coupled to ground potential. When the transistor 282 turns on, the collector thereof is drawn to a low potential, thereby applying the low potential pulse to the reset input 274. The plate of the capacitor 284 coupled to the collector is recharged by a current through the resistor 286.

The third way in which the reset pulse may be developed is internally under software control of the controller 16 by developing a high potential pulse at the output 190 while the controller 16 is disarmed. This high pulse will be coupled to an input of a NAND gate 292 through a resistor 294. When this high potential pulse is applied to this input, and with the other input held at a high potential and being biased to source potential through a resistor 296, the output of the NAND gate 292 will momentarily go low and then return high. Since the ignition circuit 12 is already on, when the output of the NAND gate 292 goes high, the output of the NAND gate 278 will go low developing the reset pulse.

It is also to be noted, when the controller 16 is in the armed state, the power output 190 thereof is always high. This forces the output of the NAND gate 292 to always be low thereby blocking the NAND gate 278 from being responsive to the ignition circuit 12. This prevents the ignition circuit 12 from generating the reset pulse when the controller is armed.

When the valet switch 164 is in its valet mode, the switch being grounded, the second input of the NAND gate 292 is at low potential. This blocks the internally generated reset pulse from having any effect at the output of NAND gate 292.

Completing the description of the hardware of this security system 10, the controller 16 has a power source input 298 which is coupled to the five volt source potential. A capacitor 300 may be used to store charge and reduce voltage ripple at the voltage input 298. The controller 16 also has oscillator input 302 and oscillator input 304. A resistor 306 is coupled between each oscillator 302, 304 with a capacitor 308 coupled to the oscillator input 302 and ground potential. The values of the resistor 306 and capacitor 308 are selected to choose the internal clock speed of the controller 16.

The ignition input 238 of the controller 16 is disabled by a diode 310 when the output of the NAND gate 292 is low. In this event, the ignition circuit 12 is turned on, the diode 310 becomes forward bias thereby maintaining the ignition input 238 at a low potential.

Returning now to FIG. 1, there is shown a flow diagram of the reset subroutine executed by the controller 16. Upon application of the reset pulse through the rest input 274 of the controller 16, and if the controller 16 is in the disarm state, the reset subroutine is entered.

Figure 1:
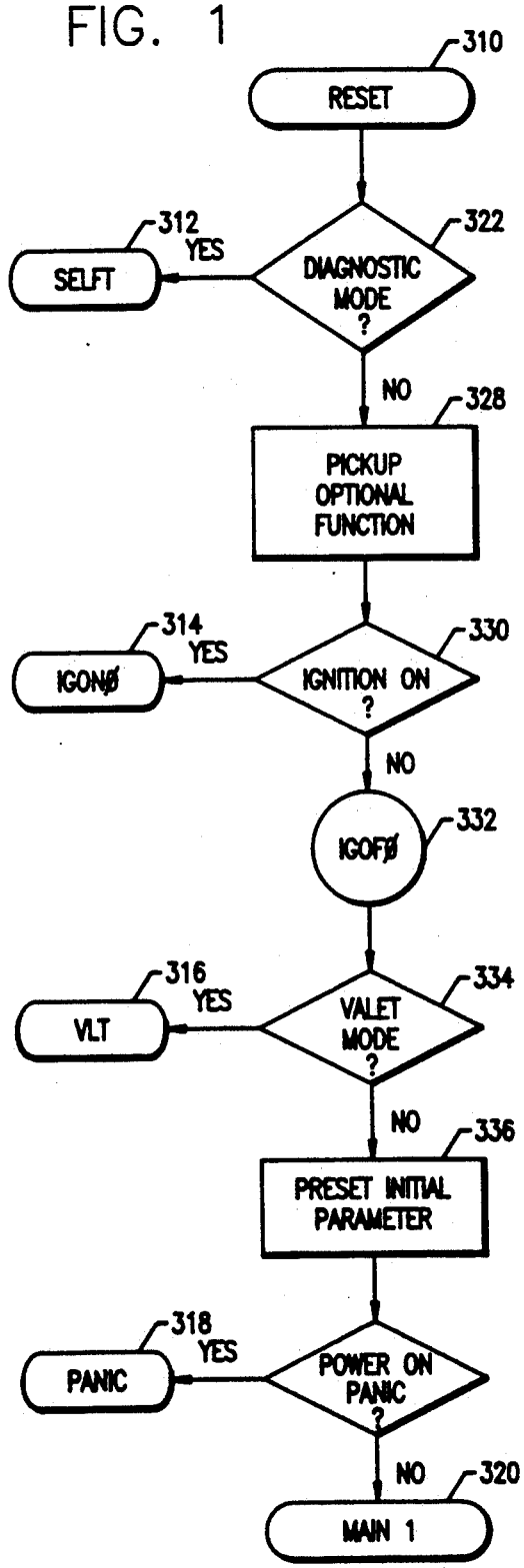
FIG. 1 is a flow chart of the reset subroutine executed upon reset of the controller shown hereunder in FIG. 12b.
Figure 3:
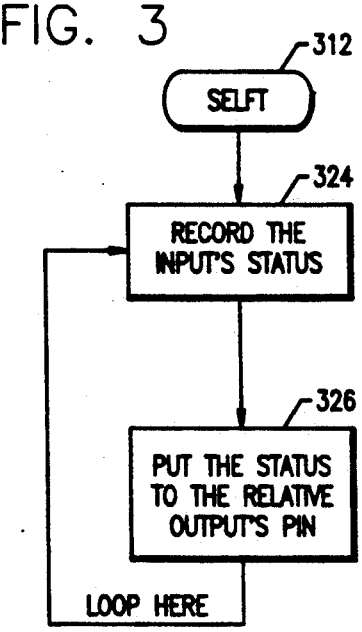
FIG. 3 is a flow diagram of the self test subroutine entered from the reset subroutine of FIG. 1.

When the reset subroutine 310 is entered, various decisions are made whether to enter a self test subroutine through 12 and an ignition and subroutine 314, a valet subroutine 316, a panic subroutine 318 or the main routine 320. Once the reset subroutine is entered, a decision is made at 322 whether the diagnostic mode has been selected. If yes, the self test subroutine is selected. In FIG. 3, the self test subroutine is a continuous loop which records the status of each of the inputs of the controller 16 and puts the status to the relative output of the controller 16 as indicated at 324 and 326, respectively. Upon completion of the self test subroutine 312, control is returned to the reset subroutine 310.

If the diagnostic mode is not selected at 322, instructions are executed at 328 if any option functions have been programmed into the system. Upon these functions being programmed, a decision is made at 330 to determine if the ignition is on. The controller 16 scans its ignition input 238 to make this determination. If the ignition is on, the controller 16 executes the instructions under the ignition on subroutine 314. If the ignition is determined to be off, control then proceeds to the ignition off entry point 332 of the reset subroutine 310. A description of the ignition on subroutine 314 is described hereinbelow.

If control is at the ignition off entry point 332, a decision is made at 334 to determine if a valet mode has been selected. If yes, the instructions of the valet mode subroutine 316 are executed.

Figure 4:
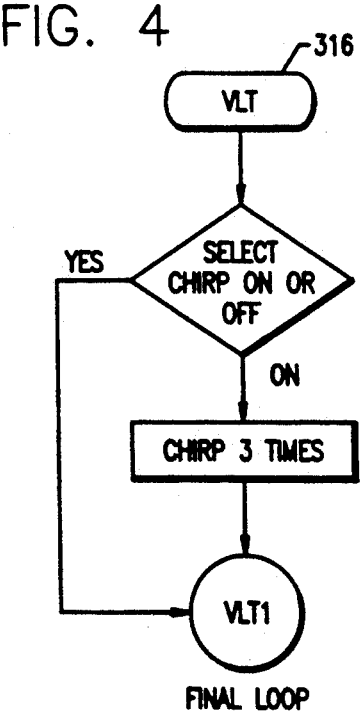
FIG. 4 is a flow diagram of the valet subroutine entered from the reset subroutine of FIG. 1.

The valet mode subroutine shown in FIG. 4, is entered if the controller 16 detects at the valet switch 164 is closed, coupling the output LED 180 of the controller 16 through ground potential.

If the valet mode is not to be entered, initial parameters in the controller 16 are preset as 336. After these parameters are preset, the decision is made to see if the controller 16 is to go into the panic mode. If yes, the panic subroutine 318 is entered. The panic subroutine is also enterable at other points in the operation of the controller 16. Whenever the input pin 254 is receiving an arm disarm pulse for a preselected time, such as three seconds continuously, a panic subroutine will be entered. If the panic subroutine is not entered, control of the controller 16 is then taken over by the main routine 320.

Figure 2:
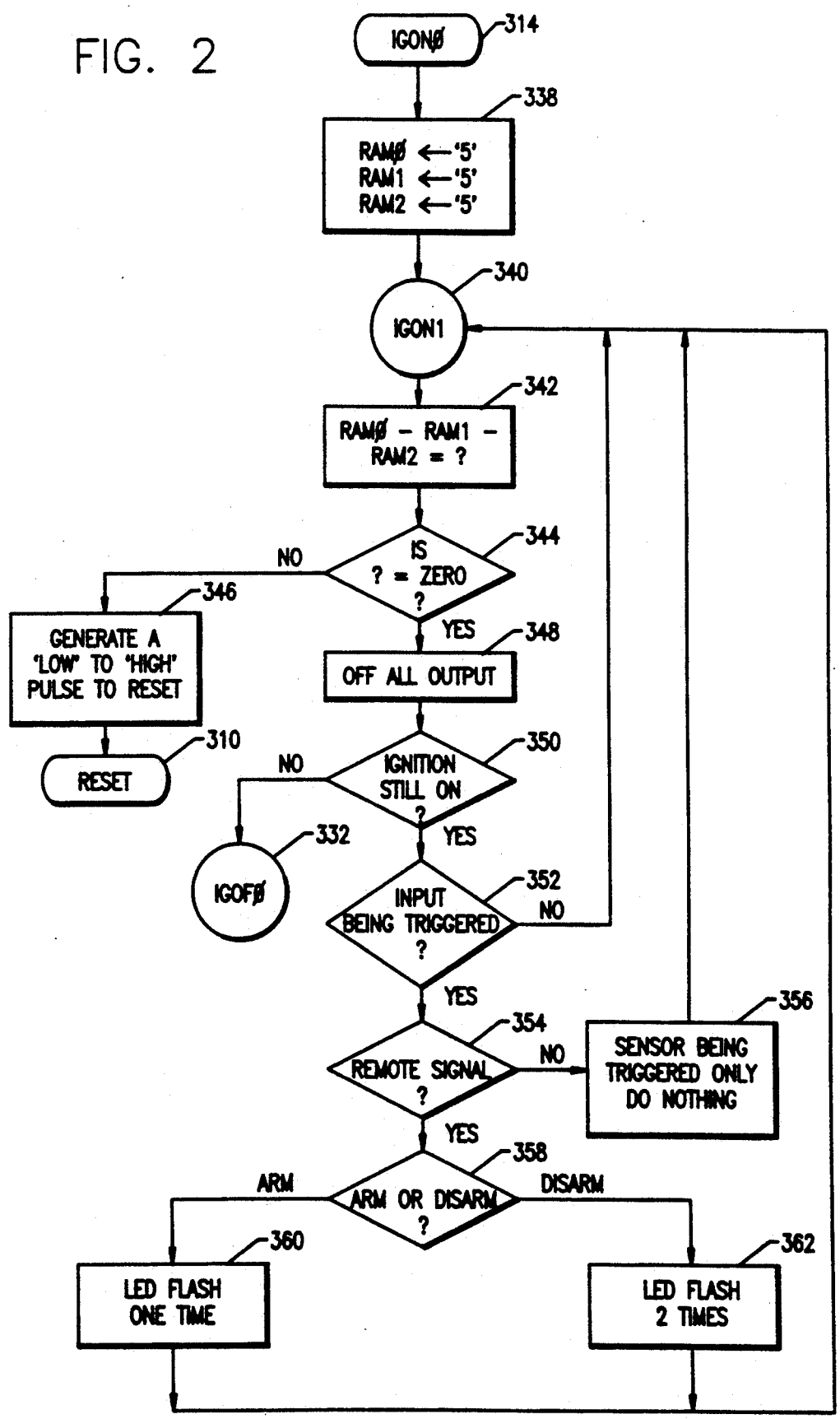
FIG. 2 is a flow chart of the ignition on subroutine entered from the reset subroutine of FIG. 1.

Referring now to FIG. 2, the flow of the ignition and subroutine 314 is described. Upon entering the ignition of subroutine 314, elected random access memory locations are cleared within the controller 16 as indicated at 338. Once these RAM locations are cleared, the ignition on entry point of the ignition on subroutine is entered at 340. At 342 and 344, a decision is made to see that each RAM location has had the same information entered into it such that the traction of each RAM location will result in zero. If not, the controller 16 generates a load of high pulse at the power output 190 to develop a reset signal as hereinabove described as indicated at 346. Control then goes to the reset subroutine 310. If the RAM locations have been zeroed, the ignition off subroutine 314 will, at 348 disable all the outputs of the controller 16. At 350, a decision is made to see if the ignition is still on. If no, control is returned to the ignition off entry point 332 of the reset subroutine 310.

If the ignition is still on, the controller 16 checks, at 352 to see if any input of the controller 16 has been triggered. If no, control returns to the ignition on entry point 340. If yes, a decision is made at 354 to see if the input that is being triggered is the arm disarm input 254. If no, instructions are executed that indicate that one of the sensors 14, 32, 54, 68 have been triggered but nothing is to be done. Otherwise, at 358, a decision is made as to what the present state armed or disarmed is of the controller and to go to the other arm or disarm state. At 360, as indicated that an only deflash occurs once if going to the arm state and at 362 instructions are executed to flash the LED 172 two times by the output device driver 170 which is operable as hereinabove described.

It is the ignition and subroutine 314 which prevents the output device drivers from going into their alarm state when any sensor has been triggered. Therefore, this ignition on subroutine is an important feature of the present invention.

Figure 5:
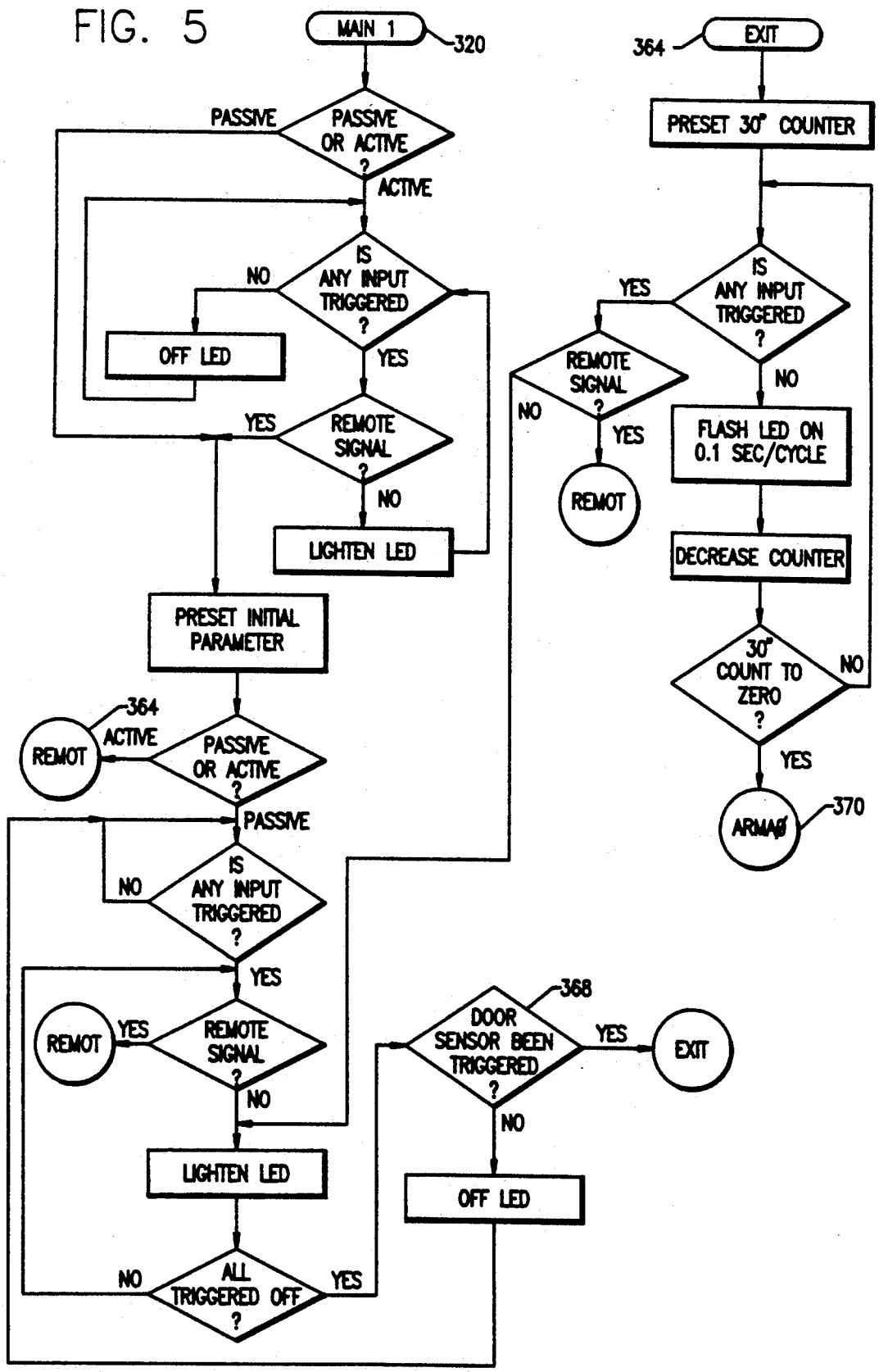
FIG. 5 is a flow diagram of the main routine entered from the reset subroutine of FIG. 1.
Figure 6:
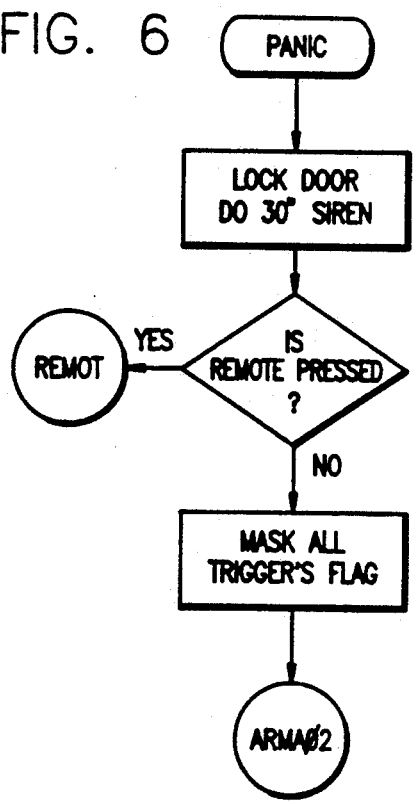
FIG. 6 is a flow diagram of the panic subroutine entered from the reset subroutine of FIG. 1, the remote subroutine shown hereunder in FIG. 7 or the disarm subroutine shown hereunder in FIG. 10.
Figure 7:
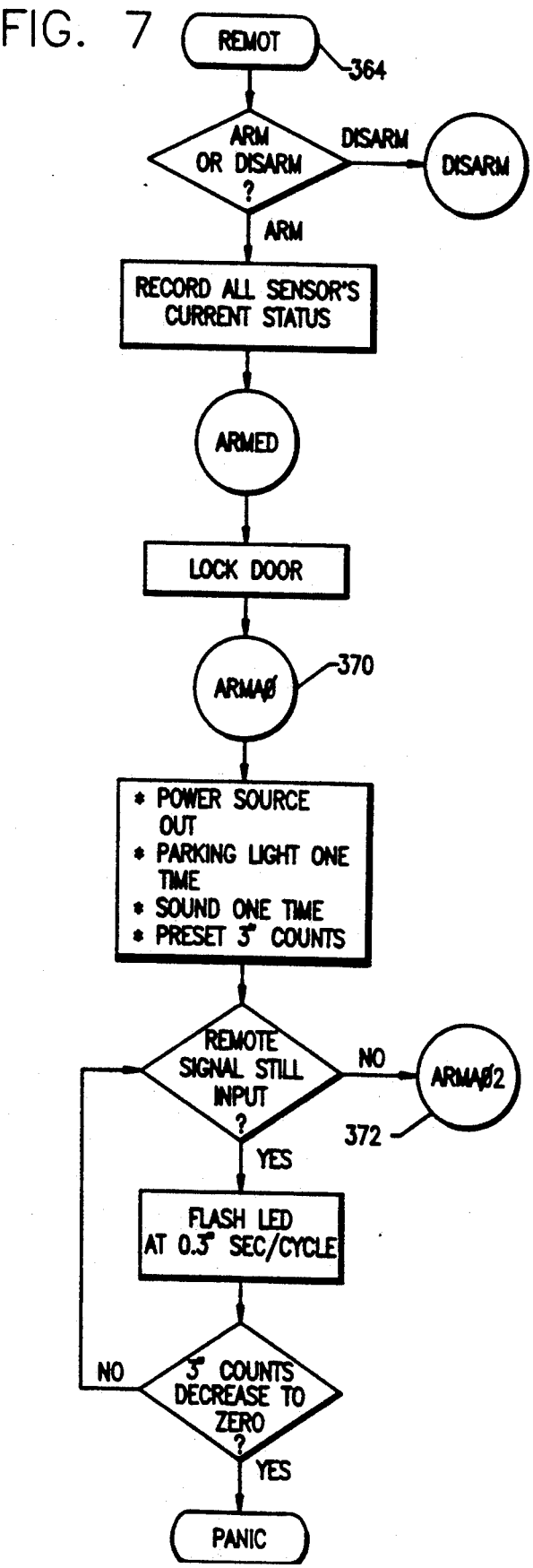
FIG. 7 is a flow diagram of the remote subroutine entered from the main routine of FIG. 5 or from other subroutines.

When control goes to the main subroutine 320, in FIG. 5, decisions are made as seen in the self explanatory flow diagram thereof. If the controller 16 is in the active or passive mode. In the main subroutine, the remote subroutine 364 is called whenever an arm disarm pulse is received at input 254 when this input is scanned by the main subroutine. The remote subroutine 364 is shown in the self explanatory flow diagram of FIG. 7. The remote subroutine 364 controls the arming and disarming of the controller 16. The exit subroutine 365 which is part of the main subroutine 320 is entered when the controller is in the passive mode. After the ignition as been turned off, the controller 16 looks for the last door closing by seeing if a door sensor has been triggered at 368. At the conclusion of the exit subroutine 364, controls goes to the arm entry point 370 of the remote subroutine 364. Thus, seeing that the armed entry point 370 in the passive mode bypasses the first half of instructions of remote subroutine 364.

Figure 8:
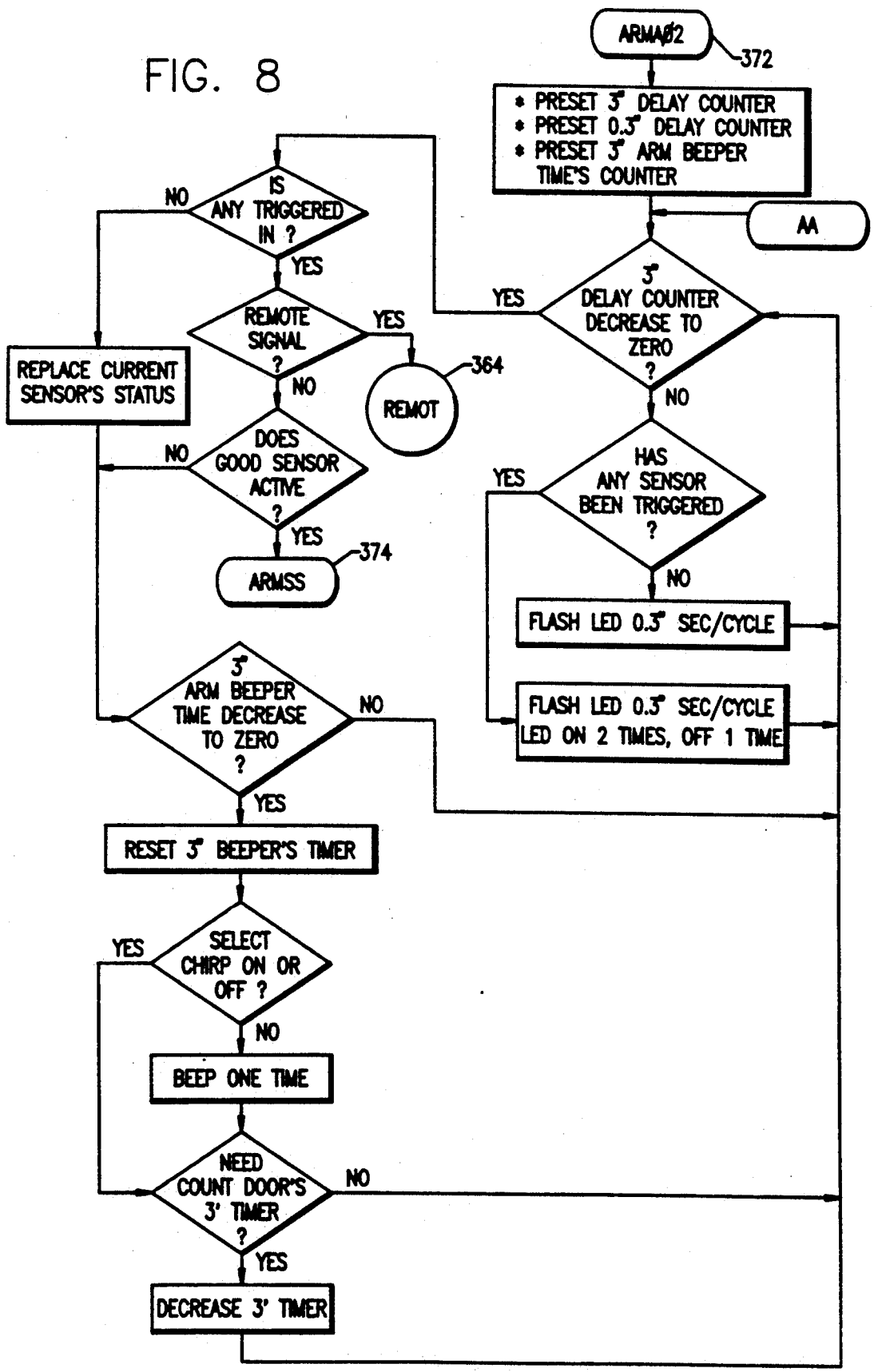
FIG. 8 is a flow diagram of the arming subroutine.
Figure 9A:
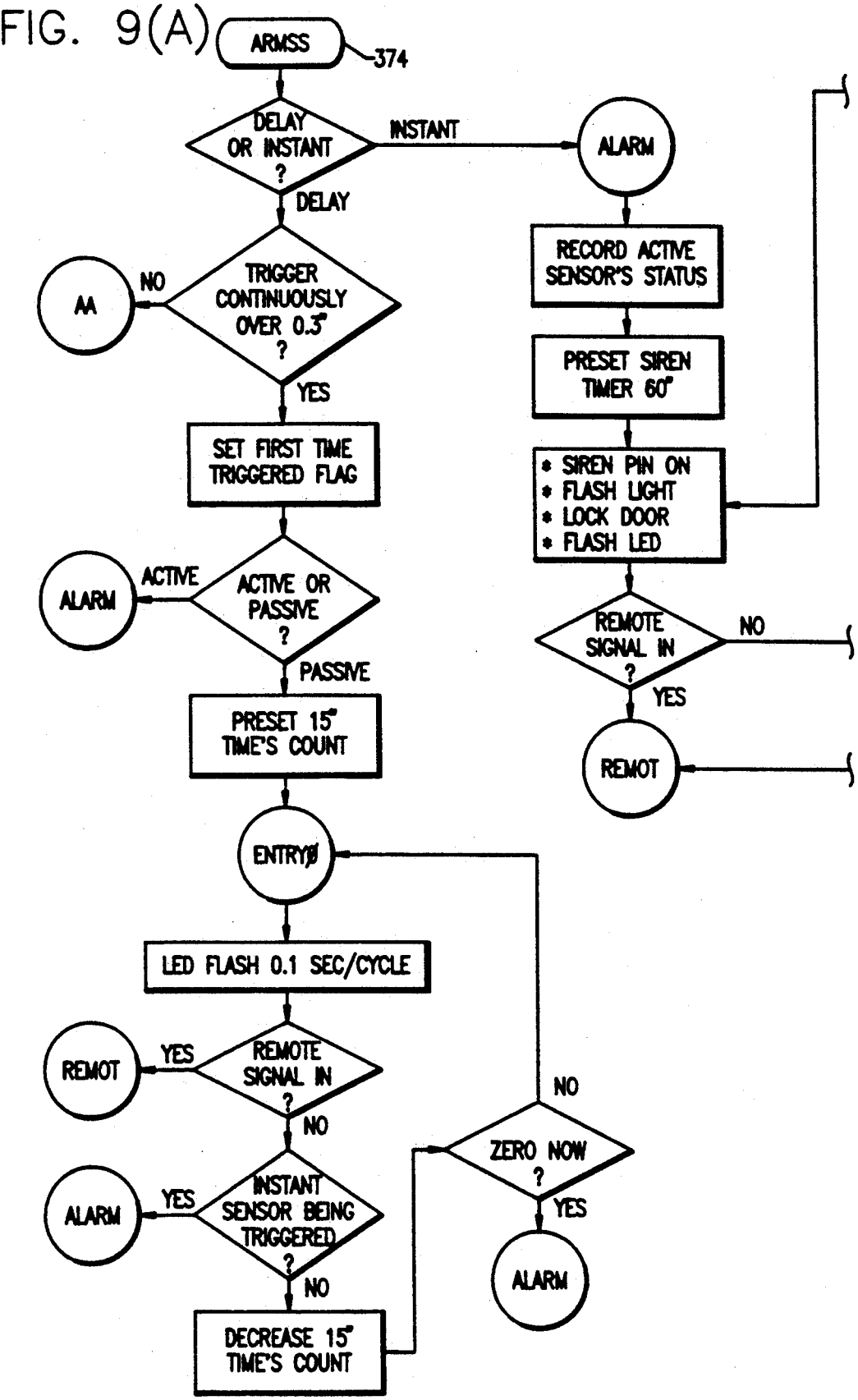
FIG. 9 is a flow diagram of the armed subroutine.
Figure 9B:
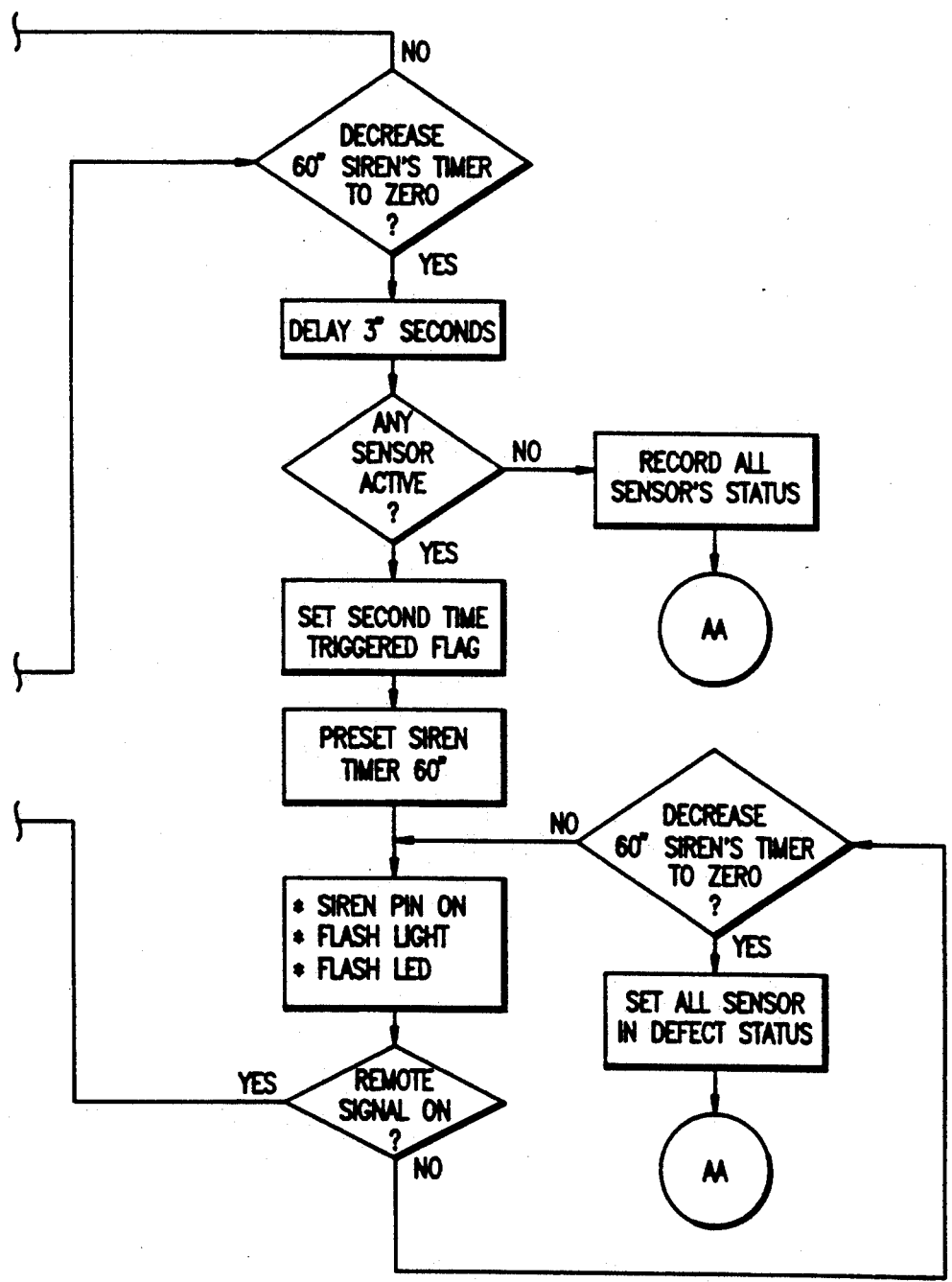

The arming subroutine 372 of FIG. 8, is entered from the remote subroutine 364. The self explanatory flow diagram controls the arming of the controller 16 to go into the armed subroutine 374 of FIG. 9 or to return to the remote subroutine 364.

Figure 10:
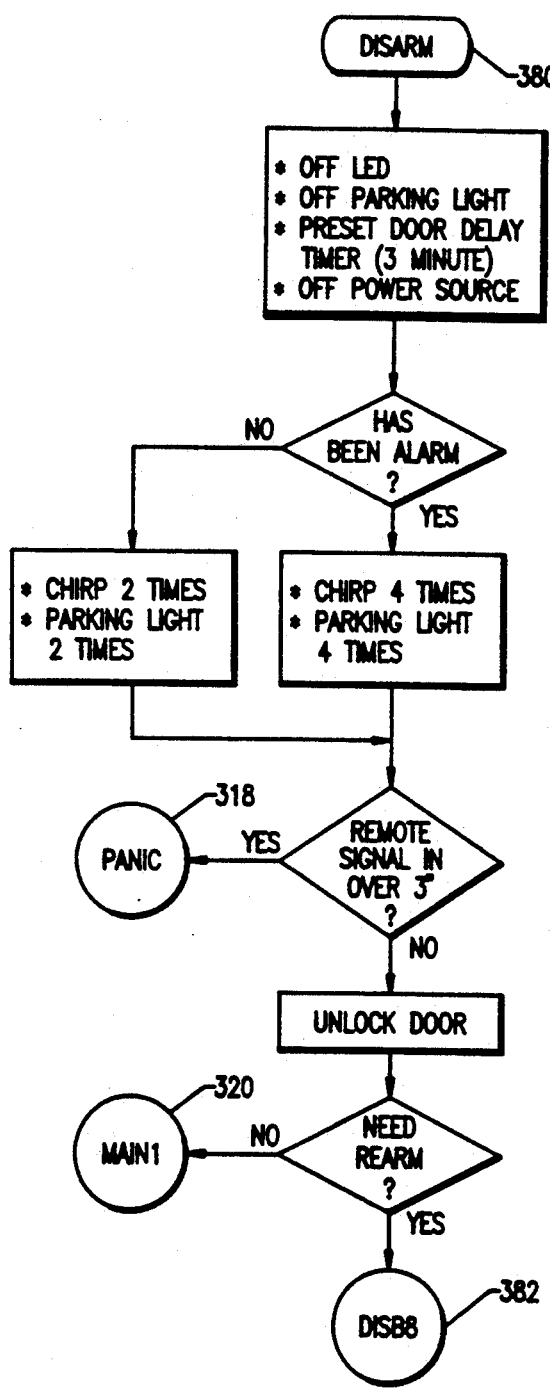
FIG. 10 is a flow diagram of the disarm subroutine.
Figure 11:
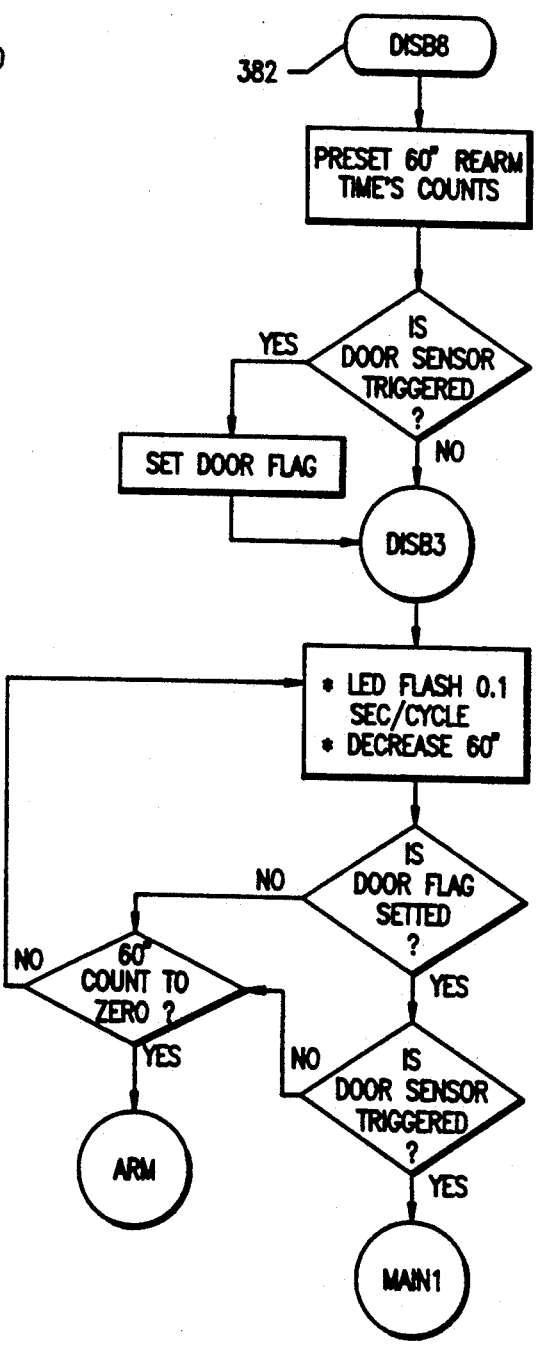
FIG. 11 is a flow diagram of the rearm subroutine.

In the remote subroutine 364, the disarm subroutine 380 may also be entered. In FIG. 10, a flow diagram of a disarm subroutine 380 is shown. From the disarm subroutine control could either go to the panic subroutine 318, the main routine 320 or into the disarming subroutine 382. The disarming subroutine 382 of FIG. 11 will either take control back to the main routine 320 or automatically arm by going back to a rearming under the control of the subroutine 382.

There has been described a novel vehicle security system 10 in constructed in accordance with the present invention. Those skilled in the art may now make numerous uses of and departures from the above exemplary preferred embodiment without departing from the inventive concepts disclosed herein. Accordingly, the present invention is to be defined solely by the scope of the following claims.

I claim:

1. A vehicle security system for a vehicle having an ignition circuit which may selectively be on or off, said vehicle security system comprising:
   at least one sensor, said sensor having a rest state and tripped state;
   a controller having an armed state and a disarmed state; and
   an output device driver having a quiescent state and an alarm state;
   said output device driver transitioning from said quiescent state to said alarm state in response to said sensor transitioning from said rest state to said tripped state when said controller is in said armed state and said ignition circuit is off, said output device driver remaining in said quiescent state when said controller is in said armed state and said ignition circuit is on independently of the present state of said sensor;
   said sensor including a capacitor having a first plate and a second plate, said first plate being coupled to said controller, each of said first plate and said second plate having a first bias potential applied thereto so that said capacitor is discharged;
   said second plate of said capacitor being adapted to be coupled electrically to a normally open circuit of said vehicle, said open circuit applying a second potential different from said bias potential to said second plate when said open circuit becomes closed, said first plate momentarily transitioning to said second potential to signal said controller that said sensor is tripped.

2. A vehicle security system as set forth in claim 1 wherein said sensor further includes:
   a first resistor coupled between said first plate and said first potential; and
   a second resistor coupled between said second plate and said first potential.

3. A vehicle security system as set forth in claim 2 wherein said first potential recharges said first plate by a current through said first resistor when said sensor is in said tripped state.

4. A vehicle security system as set forth in claim 3 wherein said capacitor is discharged upon said sensor returning to said rest state by a current through each of said first resistor and said second resistor.

5. A vehicle security system as set forth in claim 4 wherein said first potential is a positive source potential and said second potential is ground potential.

6. A vehicle security system for a vehicle having an ignition circuit which may selectively be on or off, said vehicle security system comprising:
   at least one sensor, said sensor having a rest state and tripped state;
   a controller having an armed state and a disarmed state; and
   an output device driver having a quiescent state and an alarm state;
   said output device driver transitioning from said quiescent state to said alarm state in response to said sensor transitioning from said rest state to said tripped state when said controller is in said armed state and said ignition circuit is off, said output device driver remaining in said quiescent state when said controller is in said armed state and said ignition circuit is on independently of the present state of said sensor;
   said sensor including a capacitor having a first plate and a second plate, said first plate being coupled to said controller, said first plate and said second plate each being at a first bias potential, and a diode being electrically coupled between said second plate and a further circuit of said vehicle which is normally at a second potential, said diode becoming forward biased when said further circuit is at a third potential which couples said second plate to said third potential, said first plate momentarily transitioning to said third potential in response thereto to signal said controller that said sensor is tripped.

7. A vehicle security system as set forth in claim 6 wherein said controller has a first input to which said first plate is coupled, said first input being biased at said first potential to recharge said first plate when said sensor is in said tripped state.

8. A vehicle security system as set forth in claim 7 wherein said sensor further includes a resistor coupled between said second plate and said first potential.

9. A vehicle security system as set forth in claim 8 wherein said capacitor is discharged upon said sensor returning to said rest state through a current through each of said resistor and said input.

10. A vehicle security system as set forth in claim 9 wherein said first potential is a positive source potential, said second potential is a vehicle battery potential higher than said source potential and said third potential is ground potential.

11. A vehicle security system as set forth in claim 6 wherein said diode has an anode coupled to said second plate and a cathode coupled to said further circuit.

12. A vehicle security system for a vehicle having an ignition circuit which may selectively be on or off, said vehicle security system comprising:
   at least one sensor, said sensor having a rest state and tripped state;
   a controller having an armed state and a disarmed state; and
   an output device driver having a quiescent state and an alarm state;
   said output device driver transitioning from said quiescent state to said alarm state in response to said sensor transitioning from said rest state to said tripped state when said controller is in said armed state and said ignition circuit is off, said output device driver remaining in said quiescent state when said controller is in said armed state and said ignition circuit is on independently of the present state of said sensor;

said sensor including a capacitor having a first plate and a second plate, said first plate being coupled to said controller, each of said first plate and said second plate being biased at a first bias potential, and a transistor circuit coupled between said second plate and a further circuit of said vehicle which is normally at a second potential, said transistor circuit changing state when said further circuit is at a third potential at which said transistor circuit couples said third potential to said second plate, said first plate momentarily transitioning to said third potential in response thereto to signal said controller that said sensor is tripped.

13. A vehicle security system as set forth in claim 12 wherein said transistor circuit includes:

a NPN transistor having a base, a collector and an emitter, said collector being coupled to said second plate, said emitter being coupled to said third potential; and a voltage divider having a series coupled first resistor and second resistor, said base being coupled to a node common to said first resistor and said second resistor, said second resistor being coupled between said node and said third potential, said first resistor being adapted to be coupled between said further circuit of said vehicle and said node, said first resistor having said second potential applied thereto when said further circuit is at said second potential such that a base drive voltage is developed at said node to turn said transistor on, said second plate being at said third potential when said transistor is on, said first plate being momentarily transitioning to said third potential in response thereto to signal said controller that said sensor is tripped.

14. A vehicle security system as set forth in claim 13 wherein said controller has a first input to which said first plate is coupled, said input being biased at said first supply potential to recharge said first plate subsequent to transitioning to said third potential.

15. A vehicle security system as set forth in claim 14 wherein said sensor includes a third resistor coupled between said second plate and said first potential.

16. A vehicle security system as set forth in claim 15 wherein said capacitor is discharged upon said sensor returning to said rest state by a current through each of said first resistor and said first input.

17. A vehicle security system as set forth in claim 16 wherein said first potential is a source potential, said second potential is a vehicle battery potential greater than said source potential and said third potential is ground potential.

18. A vehicle security system for a vehicle having an ignition circuit which may selectively be on or off, said vehicle security system comprising:

at least one sensor, said sensor having a rest state and tripped state;

a controller having an armed state and a disarmed state; and an output device driver having a quiescent state and an alarm state;

said output device driver transitioning from said quiescent state to said alarm state in response to said sensor transitioning from said rest state to said tripped state when said controller is in said armed state and said ignition circuit is off, said output device driver remaining in said quiescent state when said controller is in said armed state and said ignition circuit is on independently of the present state of said sensor;

said sensor including a current sensing circuit responsive to a battery potential and an alternator potential of said vehicle such that said circuit develops a pulse in response to a current developed in said alternator circuit dropping said alternator potential less than said battery potential, said pulse indicating said sensor being in said tripped state, and a first capacitor having a first plate and a second plate, said first plate being coupled to said controller, said capacitor being normally biased to be discharged, said pulse being applied to said second plate to signal said controller that said sensor is tripped.

19. A vehicle security system as set forth in claim 18 wherein said current sensing circuit includes:

a first transistor biased by each of said alternator potential and said battery potential, said transistor turning on when said alternator potential is less than said battery potential;

a second transistor capacitively coupled to said first transistor and biased to turn on momentarily in response to said first transistor turning on; and a monostable circuit coupled to said second transistor, said monostable circuit having a normally biased first state and an unstable second state, said monostable circuit developing said pulse when in said second state.

20. A vehicle security system as set forth in claim 19 wherein said monostable circuit includes:

a first NAND gate having a first input, a second input and an output, said first input being biased at a positive source potential and further coupled to said second transistor;

a second NAND gate having a first input, a second input and an output, said first input of said second NAND gate being coupled to said output of said first NAND gate, said second input of said first NAND gate being coupled to said output of said second NAND gate;

a resistor coupled between each of said second input and said output of said second NAND gate; and a second capacitor coupled between said second input of said second NAND gate and ground potential, said second capacitor being normally biased to be charged, said second capacitor being discharged when said pulse is developed.

21. A vehicle security system as set forth in claim 20 wherein said sensor further includes:

a resistor coupled between a positive source potential and said second plate of said first capacitor to bias said second plate, said controller having a first input at which said first plate in connected wherein said first input is normally biased at said source potential.

22. A vehicle security system as set forth in claim 21 wherein said sensor further includes:

a diode coupled between said resistor and said second capacitor, said diode becoming forward biased when said pulse is developed to recharge said second capacitor thereby returning said monostable circuit to its first state.

23. A vehicle security system as set forth in claim 19 wherein said second transistor is further coupled to a fan circuit of said vehicle such that said second transistor remains off should said fan circuit cause said first transistor to turn on.

24. A vehicle security system as set forth in claim 19 wherein said first transistor is a PNP transistor having a base, a collector and an emitter, said base being biased by said alternator potential, said emitter being biased by said battery potential, said collector being in electrical communication with said second transistor.

25. A vehicle security system as set forth in claim 24 wherein said sensor further includes:
   a base drive resistor coupled between said alternator potential and said base;
   a base bias resistor coupled between said base and ground potential;
   an emitter resistor coupled between said battery potential and said emitter;
   a collector bias resistor coupled between said collector and ground potential; and
   a diode having an anode coupled to said alternator potential and a cathode coupled to said battery potential, said diode being normally forward biased to keep said first transistor off and becoming reverse biased when said alternator potential is less than said battery potential.

26. A vehicle security system as set forth in claim 25 wherein said sensor further includes:
   a second capacitor coupled between said base and said emitter; and
   a third capacitor coupled between said emitter and ground potential, 27. A vehicle security system as set forth in claim 19 wherein said second transistor is NPN transistor having a base, a collector and an emitter, said base being capitively coupled to said first transistor, said collector being connected to said monostable circuit and said emitter being biased to ground potential.

28. A vehicle security system as set forth in claim 27 wherein said sensor further includes:
   a base bias resistor coupled between said base and ground potential; and
   an emitter resistor coupled between said emitter and ground potential.

29. A vehicle security system as set forth in claim 27 wherein said sensor further includes an inductor coupled between said collector and said monostable circuit.

30. A vehicle security system as set forth in claim 27 wherein said sensor further includes:
   a resistor; and
   a diode having an anode and a cathode, said resistor being coupled between a fan circuit of said vehicle and said anode, said cathode being coupled to said emitter, said diode becoming forward biased when said fan circuit is turned on to prevent said second transistor from being turned on even if said first transistor is turned on in response to said fan circuit drawing current from said alternator circuit.

31. A vehicle security system for a vehicle having an ignition circuit which may selectively be on or off, said vehicle security system comprising:
   means responsive to an unauthorized tampering of said vehicle for developing a sensor tripped signal;
   a controller including means responsive to an externally developed arm/disarm signal for transitioning said controller between each of an armed state and a disarmed state upon each occurrence of said arm/disarm signal, means responsive to said sensor tripped signal for developing an output triggered signal when said controller is in said armed state and means responsive to said ignition circuit being on for disabling said output triggered signal developing means even if said controller received said tripped signal when in said arm state; and
   means responsive to said triggered signal for developing either one of an audible alarm and visible alarm.

32. A vehicle security system as set forth in claim 31 wherein controller further includes reset means responsive to an external reset signal for initializing operation of said controller to determine a sequence of further operation of said controller.

33. A vehicle security system as set forth in claim 32 wherein said reset means determines if said ignition circuit is on to enable operation of said disabling means.

34. A vehicle security system as set forth in claim 33 wherein said controller has an ignition input, said system further comprising means for developing an ignition on signal for application to said ignition input when ignition circuit is on.

35. A vehicle security system as set forth in claim 32 wherein said disabling means includes:
   means for biasing the output of said controller in an off state;
   first means for determining if said ignition circuit is still on to return operation of said controller to said reset means if said ignition circuit is off and to retain operation of said controller with said disabling means if said ignition circuit is on; and
   second means for determining if an input of said controller is receiving an input signal to return operation of said controller to said biasing means if no input signal is present and to determine the nature of any input signal which is present, said second determining means returning operation of said controller to said biasing means if only said sensor trip signal is received and changing the state of said controller from the present one of said armed state and said disarmed state to the other one of said armed state and said disarmed state if said externally developed arm/disarm signal is received.

* * * * *